(12) United States Patent
Narayanabhatla (10) Patent No.: US 7,209,739 B1
(45) Date of Patent: Apr. 24, 2007

(54) METHOD AND SYSTEM FOR PROCESSING CALLS WITHIN A LOCAL MICRO NETWORK

(75) Inventor: Shiva Narayanabhatla, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 141 days.

(21) Appl. No.: 11/024,179

(22) Filed: Dec. 28, 2004

(51) Int. Cl.
*H04Q 7/20* (2006.01)

(52) U.S. Cl. .............................. 455/426.2; 455/426.1; 455/445; 455/560; 398/74; 398/77; 398/78; 398/115; 398/116; 398/117

(58) Field of Classification Search ............. 455/426.1, 455/426.2, 414.1, 561, 554.2, 432.1, 560, 455/445; 398/115, 116, 117, 58, 74, 77, 398/78; 370/350, 346
See application file for complete search history.

(56) References Cited

U.S. PATENT DOCUMENTS

| | | | |
|---|---|---|---|
| 6,231,087 B1 * | 5/2001 | Ziu ........................ | 285/123.16 |
| 6,640,100 B1 * | 10/2003 | Kojima et al. ........... | 455/426.2 |
| 6,876,852 B1 * | 4/2005 | Li et al. .................. | 455/426.2 |
| 7,050,799 B2 * | 5/2006 | Menon et al. ........... | 455/426.2 |
| 2002/0003645 A1 * | 1/2002 | Kim et al. ................ | 359/145 |
| 2003/0007214 A1 * | 1/2003 | Aburakawa et al. ...... | 359/145 |
| 2003/0125024 A1 * | 7/2003 | Numminen et al. ........ | 455/434 |
| 2004/0053602 A1 * | 3/2004 | Wurzburg ................ | 455/412.1 |
| 2004/0203873 A1 * | 10/2004 | H. Gray .................. | 455/456.1 |
| 2005/0163070 A1 * | 7/2005 | Farnham et al. ........... | 370/328 |

OTHER PUBLICATIONS

"Best of both worlds", http://www.neon.co.uk/tech/editorial.cfm?categoryid=219&editorialid=3218, Dec. 19, 2001.
Andrew Debuts EOCell™ RF Over Fiber Solutions, http://www.b-com.dk/and_pr_131102a.htm, Jul. 23, 2003.

* cited by examiner

*Primary Examiner*—Jean Gelin
*Assistant Examiner*—Olumide Ajibade-Akonai

(57) ABSTRACT

A method and system for processing calls in a telecommunications system using fiber extender loops providing a local micro network. Calls originating from subscribers within the local micro network to subscribers that are also provided service within the local micro network are processed and connected by a location base station within the local micro network.

20 Claims, 6 Drawing Sheets

METHOD AND SYSTEM FOR PROCESSING CALLS WITHIN A LOCAL MICRO NETWORK

FIELD OF INVENTION

The present invention a provides method and system for processing calls in a telecommunications system using fiber extender loops to provide wireless micro networks.

BACKGROUND

Wireless radio frequency communications has enabled truly mobile telecommunication service and extended communication service into areas that may otherwise be difficult to reach with conventional wire line based telecommunications infrastructure. For instance, various forms of mobile wireless communications such as CDMA, GSM, TDMA have proliferated worldwide in the last decade. Further, fixed location wireless services promise to economically bring telecommunications to areas of the world where the cost of installing a wire-based telecommunication switching infrastructure would be prohibitively high.

Certain geographic service areas, however, present a challenge for providing wireless service. Electromagnetic signals propagating at the radio frequencies ("RF") typically used for wireless communications have difficulty penetrating obstacles such as mountains, valleys, buildings, or simply long distances. Other forms of interference may make providing reliable wireless services a challenge. The interior of buildings and other areas near tall buildings and earthen obstacles may be difficult to reach with service or have dead spots within the coverage area.

Fiber optic links can be used to extend wireless communication service into areas which would be difficult for wireless signals to reach. Transmitting RF over fiber allows radio signals used for wireless communications to be carried to wireless access points which can be placed in areas that would otherwise be difficult for wireless services to reach such as a campus of buildings, large parking structures, enclosed shopping malls, tunnels, underground transportation complexes, etc. Fiber provides high speed, high isolation and immunity to electrical interference, plus low loss for spanning distances without the need for repeaters, amplifiers or other costly equipment. By transmitting RF signal over a fiber optic link, wireless signals can be economically extended into areas without the cost of installing conventional wire-based telecommunications switching infrastructure.

The RF-to-fiber interface is also easily provided with low cost equipment and fiber provides high bandwidth and transmission capacity. RF over fiber extender links or loops are typically interfaced directly with conventional wireless base stations (BS) providing wireless service, further leveraging existing infrastructure and reducing the cost of providing service.

Relying on existing wireless base stations to interface fiber links, however, may not be an efficient manner of handling calls on a fiber link. For instance, using the fiber link to simply extend the wireless network requires the conventional wireless base stations to still process all call traffic from the fiber extender link. Even local call traffic initiated from and terminated between stations entirely within the same extender loop is connected through the wireless base station, even though the call does not need to be connected through the base station. Such call routing raises issues with network capacity and equipment costs.

By providing equipment capable of switching wireless calls on the fiber link, efficiencies in call processing may be realized. Thus, there is a need to better provide equipment capable of processing and handling calls transported on fiber links.

SUMMARY

According to an exemplary embodiment of the invention, a fiber optic link provides a local micro network. The micro network provides wireless communications service to mobile stations through a number of nodes or wireless access points connected to the fiber link. The fiber link is connection to the public switched network through a location base station. The location base station connects fiber link to the cellular network's base station controller and mobile switching center to connect to the public switched telephone network. The location base station interfaces the fiber link to the cellular base station controller to route calls from mobile stations on the micro network to stations outside the micro network.

In one embodiment, calls from mobile stations within the local micro network to other stations within the same micro network can be routed more efficiently. The location base station identifies the calling station and the called station as both being on the micro network. The location base station then routes the call directly to the called station within the micro network. The location base station provides the micro network self contained call processing.

In a particular embodiment, a method for processing wireless calls originating and terminating within a local fiber loop is provided. The method includes identifying origination of a calling party as a wireless subscriber currently provided service by a local fiber optic network and identifying a called party as a subscriber currently provided service by the local fiber optic network of the calling party. Following, the method includes connecting the calling party to the called party through a local base station within the local fiber optic network if the calling party and called party are both subscribers currently within the local fiber loop.

In one embodiment, the method may be performed by a location base station. The location base station may include an interface in communication with a micro network and a macro network, memory including a list of mobile nodes being provided wireless service by the micro network through which the location base station routes call traffic, and a processor. The processor is operable to update the list of mobile nodes as mobile nodes enter or leave coverage areas of the micro network, and to route call data traffic between a calling party who is a wireless subscriber currently provided service by the micro network and a called party who is also a wireless subscriber currently provided service by the micro network solely through the micro network.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

DETAILED DESCRIPTION

In an exemplary embodiment, a method of routing calls within a micro network is provided. Calls that are placed by a mobile within a micro network to another mobile within the same micro network are routed solely within the micro network. For example, a location base station within the micro network may receive call origination requests from mobiles operating in the network and determine a location of the mobile to which the call is placed. If the call is placed to a mobile outside of the micro network, then the origination request can be processed as known in the art, by forwarding the request to a base station controller located in the macro network. However, for calls placed to mobiles operating in the micro network, the location base station will route the calls through a micro network fiber ring.

Figure 1:
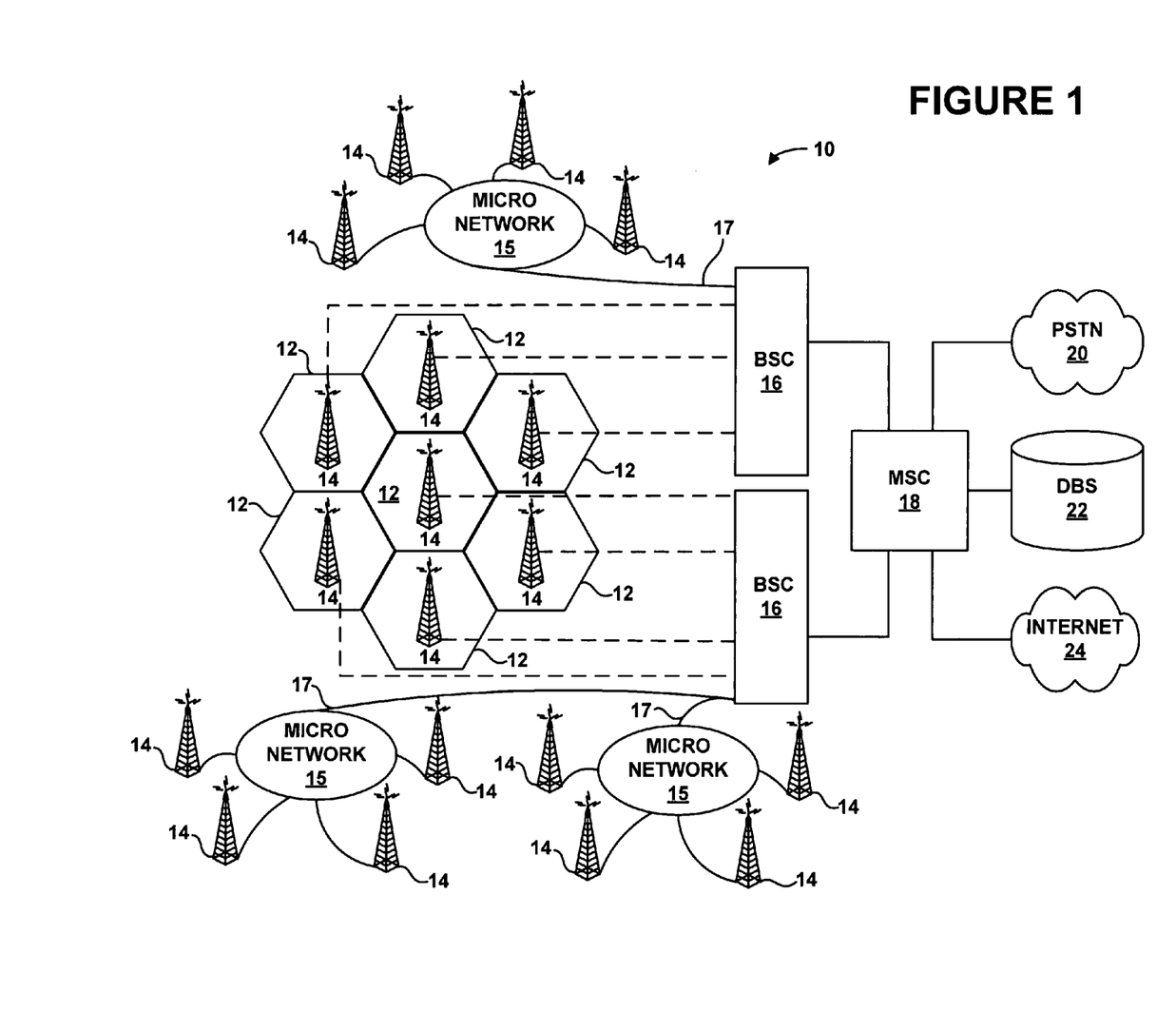
FIG. 1 is a block diagram illustrating one embodiment of components of a cellular radio communication system.

FIG. 1 is a block diagram illustrating components of a cellular radio communication system (e.g., wireless telecommunication network) 10. In the wireless communication network 10, an area is divided geographically into a number of cell sites 12. Each cell 12 can be defined by a radio frequency (RF) radiation pattern from a respective base transceiver station (BTS) 14 antenna, and each cell 12 can include one or more sectors (not shown). Each BTS 14 can transmit and receive wireless communications to and from mobile nodes (not shown). Each BTS 14 might connect to a base station controller (BSC) 16. As its name suggests, the BSC 16 functions to control communications via one or more BTSs 14. For instance, in some arrangements, a BSC might control the power level of signals emitted wirelessly by a BTS and might control the handoff of communications as a client station moves between sectors within a BTS coverage area.

Each BSC 16 can be coupled to a communication switch or gateway, such as a mobile switching center (MSC) 18 or a packet data serving node (PDSN), for instance. The switch or gateway can manage calls and may be coupled to a telecommunications network, such as the public switched telephone network (PSTN) 20, the ANSI-41D SS7 Network, or another network such as the Internet 24 or another IP network. The MSC 18 may maintain one or more database(s) (DBS) 22 that can store customer subscriber and/or system information. In an exemplary embodiment, the MSC 18 may then authenticate and register client stations on the network 10 and process account information for customers and subscribers on the network.

When a mobile subscriber or client station is positioned in a cell 12, the client station may communicate via an RF air interface with the BTS 14 serving that cell. Through the RF air interface and various system components described, a communication path can be established between the client station and the telecommunications network, via the air interface, the BTS 14, the BSC 16, and the switch or gateway (MSC 18, for example).

A client station might communicate with the BTS 14 using any of a variety of different protocols. For instance, in a TDMA system, each BTS 14 typically communicates over a group of frequencies, and each frequency may itself carry a plurality of multiplexed calls. In a CDMA system, by comparison, each BTS 14 communicates over a spread spectrum of frequencies, and the spectrum may carry many multiplexed calls. Typical components for CDMA systems include those described in the TIA standard, ANSI/ITA/EIA-95-B-99, dated Feb. 3, 1999, which is incorporated herein by reference in its entirety. The Global System for Mobile Communications (GSM) or other methods may also be used. One exemplary wireless communications format is "CDMA 2000," such as described in EIA/TIA/IS-2000 Series, Rev. A (published March 2000), which is fully incorporated herein by reference.

In addition to cells 12 served by base stations 14, wireless radio communications can be provided from a fiber optics connection link 17 to form a local micro network(s) 15. The micro network 15 provides wireless communications service to mobile client stations through a number of nodes or wireless access points connected on the fiber link 17. Similar to a BTS 14, fiber links 17 can be connected to BSC 16, which in turn, is coupled to a MCS 18 or PDSN (not shown) to the PSTN 12.

In a preferred embodiment, the fiber links 17 provide wireless service into areas that may otherwise be difficult to penetrate with wireless signals. The fiber link 17 is routed past and into areas that are difficult to penetrate and serve with wireless signals. Fiber link 17 provides a medium to carry wireless signals past and through obstructions that may otherwise attenuate and block wireless signals, for example. Using fiber link allows wireless signals to be routed into obstructed areas where the wireless signals can be converted back to an air interface. Wireless signals on the fiber link 17 can then provide wireless service to the otherwise obstructed area.

The micro network 15 may provide wireless service in areas that are difficult to reach with wireless radio signals. Wireless radio communications use electromagnetic signals that have difficulty penetrating obstacles such as mountains, valleys, buildings, long distances or other forms of interference may make providing reliable wireless service a challenge. The interior of buildings and other areas near tall buildings and earthen obstacles may be difficult to reach with service or have dead spots within the coverage area. Fiber links provide high speed, high isolation and immunity to electrical interference, plus low loss for spanning distances without the need for repeaters, amplifiers or other costly equipment.

In one embodiment, fiber optic links 17 can be used to extend service into these difficult to reach areas such as a campus of buildings, large parking structures, enclosed shopping malls, tunnels, underground transportation complexes, etc. By transmitting RF signals over a fiber optic link, wireless signals can be economically extended into areas without installing conventional wire-based telecommunications switching infrastructure.

Figure 2:
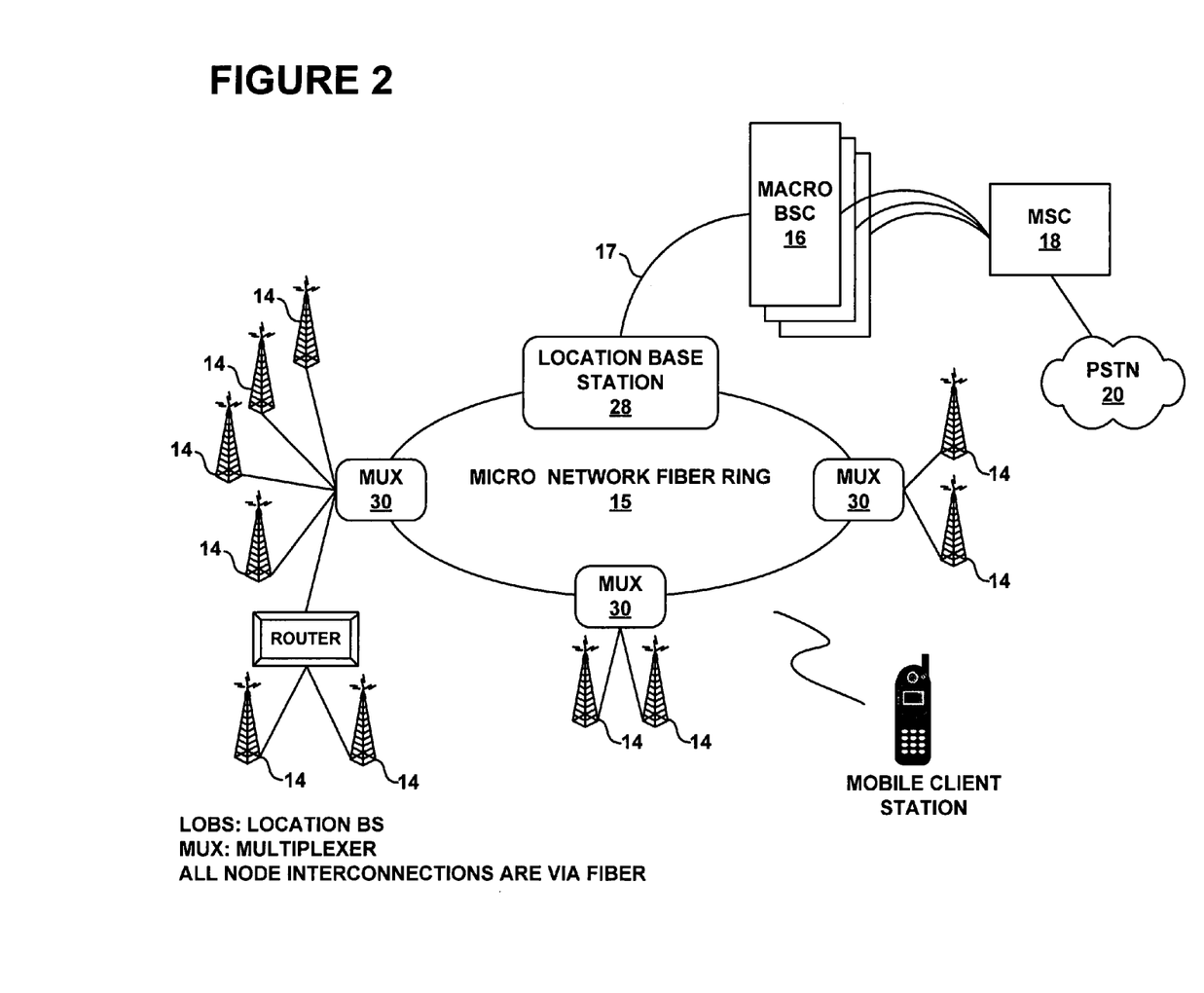
FIG. 2 is a block diagram illustrating an exemplary embodiment of a micro network.

Referring to FIG. 2, an exemplary embodiment of a micro network 15 is shown formed by a fiber link 17 and multiplexers (mux) 30, base stations 14 and a location base station 28. Micro network 15 includes fiber link 17 forming a local fiber optic ring carrying RF signals to multiplexers 30. Multiplexers 30 interface the fiber optic ring 17 to a variety of signals carried by the fiber link. In one embodiment, fiber link 17 carries signals normally transmitted wirelessly through an air interface such as the TDMA, CDMA or GSM signals discussed above. The fiber link 17 enables an RF air interface to provide local wireless service to otherwise difficult to serve areas. As shown in the FIG. 2, the fiber link 17 and multiplexers 30 can also provide other types of packet data network services using traditional equipment such as routers, bridges, switches, hubs, etc, for example.

The micro network 17 in this embodiment is connected to a wider area network, such as a PDSN or PSTN, through a location base station 28. In a preferred embodiment, the location base station 28 connects the micro network 15 of fiber link 17 to the macro network's base station controllers (referred to as Macro BSC 16) and MSC 18 to connect to the PSTN 20. The location base station 28 interfaces the fiber link 17 to the Macro BSC 16 to route calls from mobile client stations on the micro network 17 to outside stations, such as stations on the PSTN 20 or other micro networks, for example.

Figure 3:
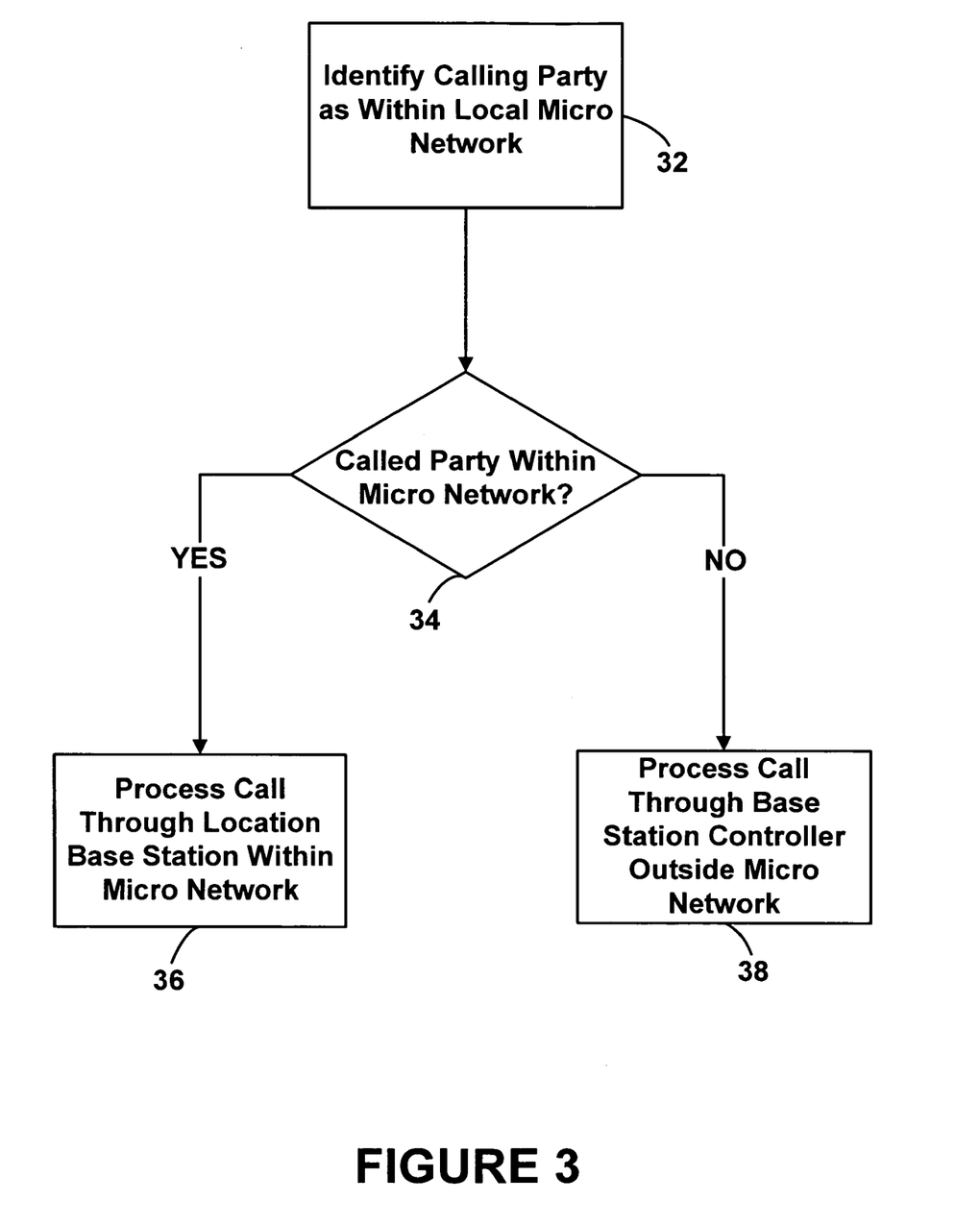
FIG. 3 is a flowchart that depicts functional blocks of one embodiment of a method of enhanced call processing.

In a preferred embodiment, the location base station 28 features an enhanced call processing capability. FIG. 3 is a flowchart that depicts functional blocks of a method of enhanced call processing. For instance, initially the location base station 28 will identify the calling party to be a member of the micro network 15, as shown at block 32. The location base station 28 will then determine whether the called party is also a member of the micro network 15, as shown at block 34. If so, (e.g., for calls from mobile stations operating in the micro network 15 to other stations operating in the same micro network 15), the location base station 28 routes the call directly to the called station within the micro network 15. If not, the location base station 28 processes the call through the BSC 16 as in conventional cellular call processing, as shown at block 38.

The location base station 28 enables the micro network 15 to operate with self-contained call processing capability, independent of the macro network. With the preferred location base stations, the micro network can process calls originating and terminating within the micro network 17 independently, without interacting with outside network components.

The location base station 28 is a base station with an added functionality to track the micro-network users. Call processing operations between the BSC 16 and the location base station 28 may occur as in a traditional cellular network. For example, for calls destined towards macro network users, the location base station 28 routes these calls to the macro BSC 16. Similarly, for incoming calls from the macro network, the location base station 28 routes these calls to the micro network 15.

Figure 4:
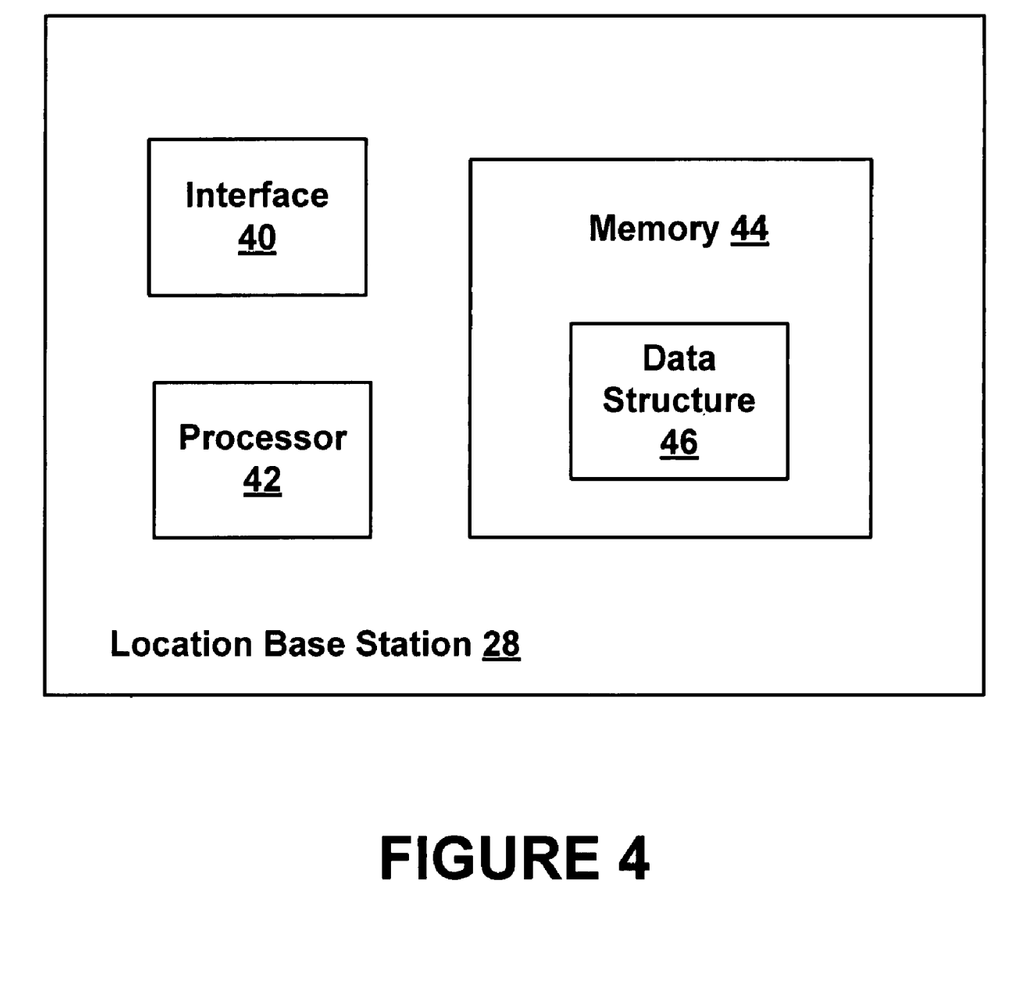
FIG. 4 is a block diagram illustrating one embodiment of a location base station.

Referring now to FIG. 4, shown is a block diagram of one embodiment of a location base station. Location base station 28 includes an interface 40, a processor 42, and memory 44, which includes a data structure 46.

The interface 40 may receive signals from mobile nodes, the BSC 16, or other entities accessible through other data networks. Therefore, the interface 40 may be a wired interface such as a port connected to a base station or any other wireless access point. Or, the interface 40 may be a packet switched network interface to allow the access point 40 to connect to data networks, such as the IP network. The interface 40 may operate bi-directionally to receive signals into the location BTS 28 and to send signals out of the location BTS 28.

The processor 42 may include a programmable digital signal processing engine or an application specific integrated circuit (ASIC), which may execute machine language instructions, for example, to allocate care-of addresses to mobile nodes. The processor 42 may also include one or more high-speed central processing units (CPU). The processor 42 may execute machine language instructions provided with software using object-oriented machine language instructions, such as the C++ programming language. However, other programming languages (such as the C or Java programming languages for instance) could be used as well.

The memory 44 may take various forms, in one or more parts. For example, the memory 44 may comprise random access memory (RAM) or read only memory (ROM), which holds program instructions and data defining logic executable by the processor 42. In addition, the memory 44 may comprise a removable storage medium, such as a Flash memory card for instance. The memory 44 could be integrated in whole or in part with processor 42.

In addition to holding program instructions, the memory 44 also stores a data structure 46 that may be in the form of a mobile node operating table. For example, the location base station 28 monitors and keeps track of which mobile nodes are operating in the micro network 15. The location base station 28 maintains such information within the data structure 46. Of course, in other embodiments, the data structure 46 may be included within a database separate from the location base station 28, and the location base station 28 can access the database to determine an operating status of the mobile nodes.

The location base station 28 may populate the data structure 46 in many ways. For example, a mobile node operating in the micro network 15 may transmit an origination request over an access channel of the air interface (such as a traffic control channel) to the location base station 28. The location BTS 28 may acknowledge the receipt of the origination request by sending an Ack message to the mobile. The location BTS 28 will then identify the called party by reading an identifier of the called party that is contained within the origination request. For example, a phone number of the called party may be contained within the origination request. The location BTS 28 can read the phone number and then determine that the mobile node is operating in the micro network 14.

The data structure 46 may be populated in other ways as well. For example, if the location base station 28 is setup to control micro network call connections, then all call origination messages from mobile nodes operating in the micro network 15 will traverse through the location base station 28. Further, the location base station 28 can be setup to receive origination messages from mobile nodes operating in the micro network 15 through an input interface. Thus, all origination messages received at the input interface can be taken as received from a mobile node operating in the micro network 15. The location base station 28 can then update the data structure 46 to reflect mobile node's operating status based on origination messages received from mobile nodes.

An example table within the location BTS 28 including information regarding all mobile nodes that are operating within micro networks for which the location BTS 28 controls is shown below in Table 1.

TABLE 1

|  | Mux 1 | Mux 2 | Mux 3 |
|---|---|---|---|
| Mobile node 1 | X |  |  |
| Mobile node 2 | X |  |  |
| Mobile node 3 |  |  | X |
| Mobile node 4 |  | X |  |
| Mobile node 5 | X |  |  |
| Mobile node 6 |  | X |  |
| Mobile node 7 |  |  | X |

As shown, the location BTS 28 may have knowledge of which mobiles are currently operating in the micro network for which the location BTS 28 controls. Further, the location base station 28 has knowledge regarding the mux to which calls for the mobile nodes should be routed.

Information regarding the mobiles that may be included within the table includes phone numbers, ESNs, MINs, or other identifiers of the mobiles, for example. The table may be populated as client stations enter or leave coverage areas of the micro network 15. Since client stations may be mobile nodes, the client stations may enter or leave coverage areas at any time. Mobile client stations may be in a variety of different forms from traditional cellular handsets to fixed wireless stations which may be mobile and set up in different locations.

Figure 5:
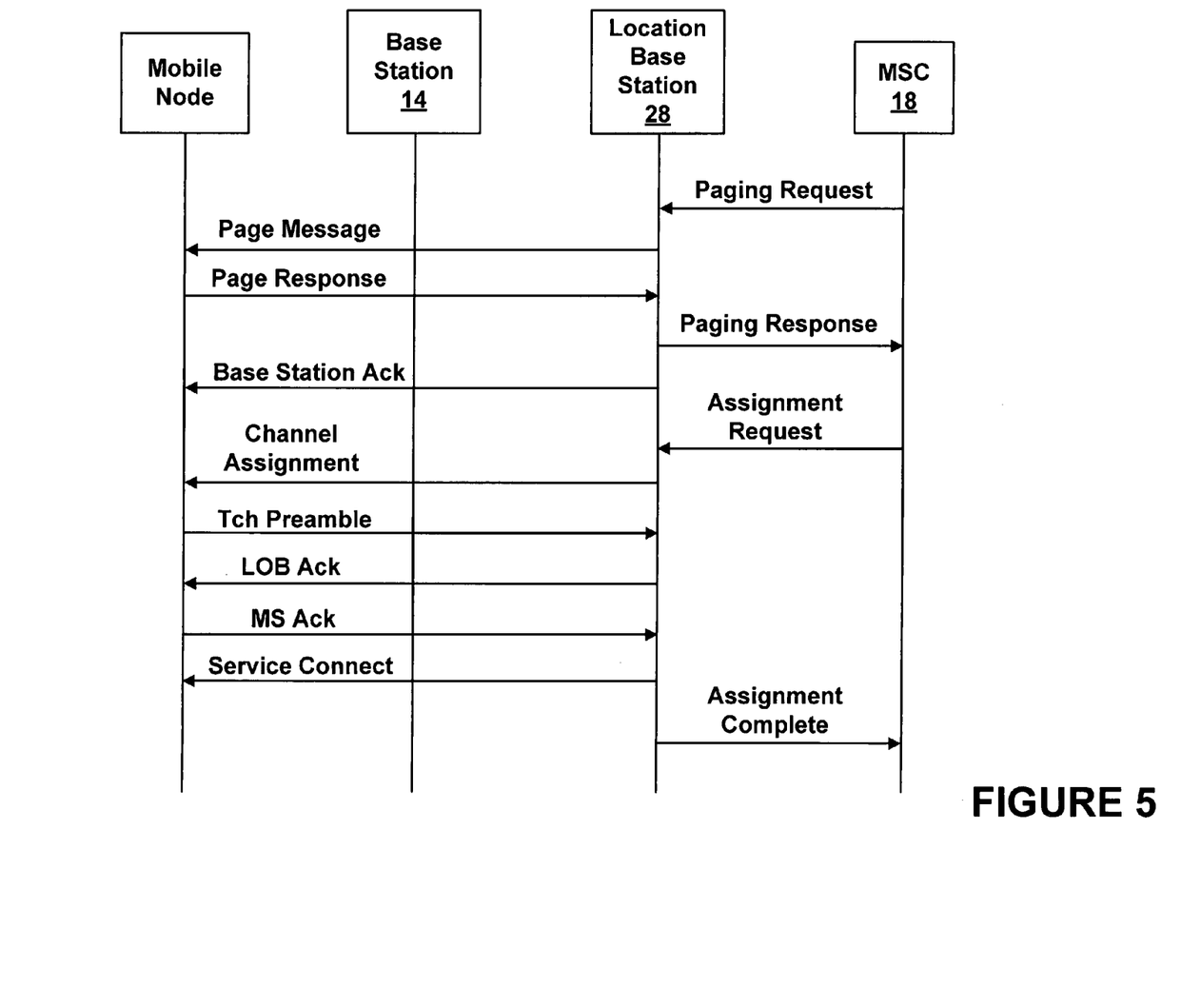
FIG. 5 illustrates one embodiment of a message flow diagram of messages sent between a mobile node and a communication system.

As a specific example of populating the table, FIG. 5 illustrates a message flow diagram of messages sent between a mobile node and the system 10. Upon entering a wireless coverage area of the micro network 15, a mobile node may listen for "paging advertisement" or paging request messages from the base stations in the micro network 15, to begin communication with the micro network. For example, the MSC 18 will send a paging request to the location base station 28, which in turn, will send the request to the base station 14 for broadcast to mobile nodes in the base station's coverage areas.

A base station may typically broadcast paging advertisements at regular intervals for example, once a second or once every few seconds. A mobile node may alternatively broadcast or multicast a solicitation that will be answered by any base station at which it was received. When the mobile node receives a paging advertisement message from a base station indicating that the mobile node is now within the base station's subnet, the mobile node registers with this base station 14, which then sends a registration request (e.g., page response) to the location base station 28 to indicate to the location base station 28 that the mobile node is operating in the micro network 15. The registration request may comprise a network access identifier (NAI) (e.g., user@domain.com) of the mobile node, an ESN or MIN of the mobile node, or other identifier information pertaining to the mobile node.

When the location base station 28 receives the registration request, the location base station 28 may add information from the registration request to the data structure 46, such as Table 1 or another routing table, and the location base station 28 may approve the registration request and send a registration reply back to the mobile node. In this manner, the location base station 28 monitors which mobile nodes are currently operating in the micro network 15.

The MSC 18 will send an assignment request to the location base station 28 that is forwarded on to the mobile node. The base station 14 will assign a wireless channel to the mobile node, and the mobile node will then receive calls from the system 10 through the wireless channel.

In the embodiment illustrated in FIG. 5, the location base station 28 logs entries of mobile nodes into the data structure 46 as mobile nodes enter and register to be provided wireless service from the BTS 14 on the local fiber micro network 15. As mobile subscribers leave the service areas being provided by the local fiber loop of micro network 15, the location base station 28 removes the mobile node from the table in the data structure 46, for example.

Figure 6:
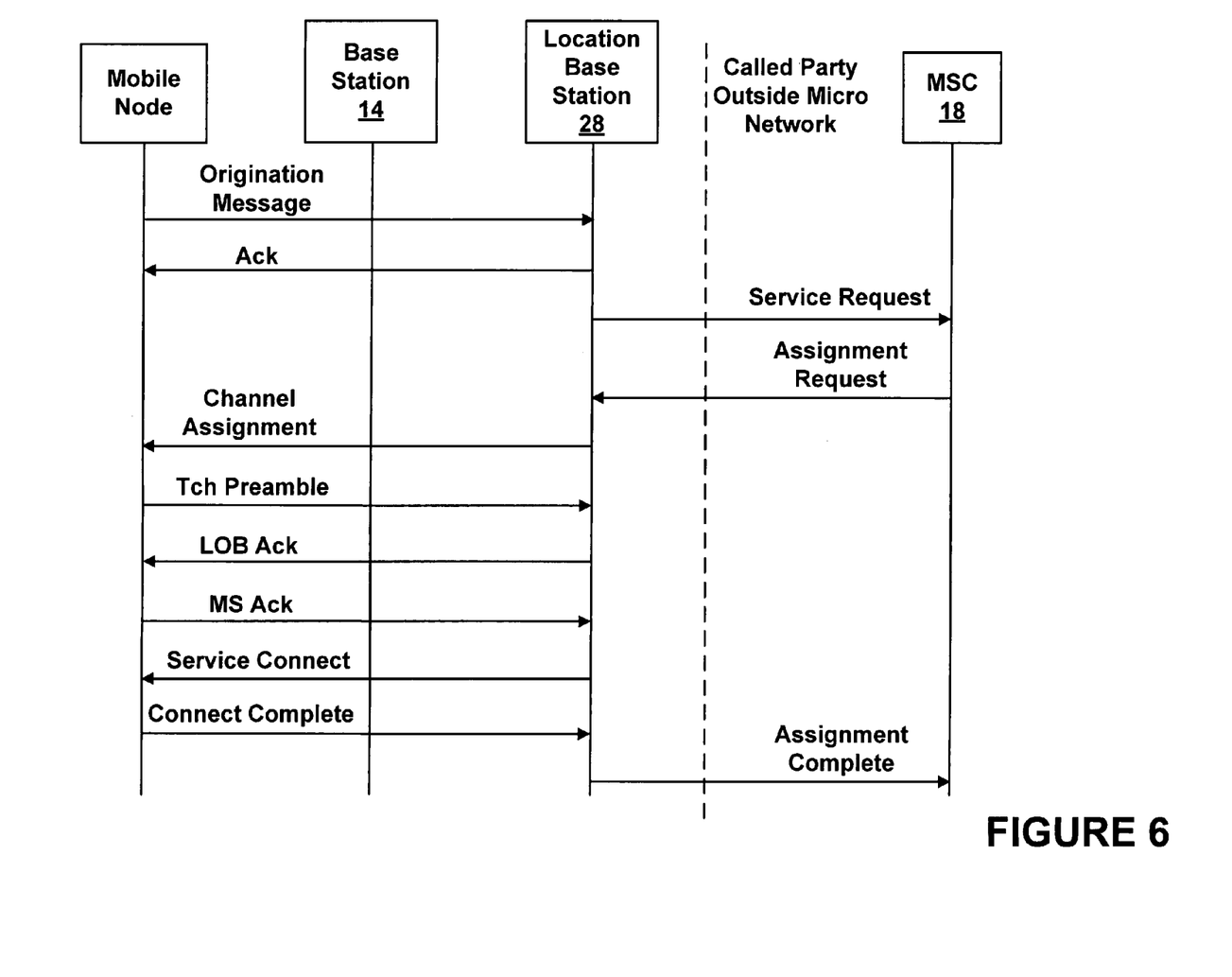
FIG. 6 illustrates one embodiment of a message flow diagram of messages sent between a mobile node and a communication system to establish a call within the micro network.

FIG. 6 illustrates a message flow diagram of messages sent between a mobile node and the system 10 to establish a call within the micro network 15. Initially, the mobile node will send a call origination message to through the base station 14 to the location base station 28. The origination message will include information regarding the mobile node, e.g., the calling party, and information regarding a user to whom the mobile node is calling, e.g., the called party. The location base station 28 will acknowledge the origination message and determine whether the called party is being provided service by the micro network 15. For example, the location base station 28 will access the data structure 46 and determine whether information within the origination message regarding the called party matches information within the data structure regarding mobile nodes operating in the micro network 15.

If the called party is operating in the micro network 15, the location base station 28 assigns a traffic control channel (Tch) and connects the call between the called party and the calling party through the mux 30 within the micro fiber network ring 15. In this instance, the call is not routed outside the ring, or outside the location base station 28.

However, if the called party is not operating in the micro network 15, then the location base station 28 will send a service request to the MSC 18 to connect the call. In this instance, the call will be connected as in a conventional cellular communication network. For example, the MSC 18 sends an assignment request message to the location base station 28 to request assignment of radio resources. If resources are available, the call may proceed.

According to other embodiments, wireline subscribers may also be provided communication services through the local fiber loop. Multiplexer 30 may provide a number of interface functions to both air interface base stations 14, as well as, to traditional wireline subscribers. Multiplexer 30 may, for instance, interface to a traditional private branch exchange ("PBX"), a digital line concentrator ("DLC") or single line POTS telephone, and route calls in between such interfaces through the micro network ring 15. In this manner, bandwidth usage within the macro network can be improved.

It should be understood, that arrangements described herein are set forth for purposes of example only. As such, those skilled in the art will appreciate that other arrangements and other elements (e.g., machines, interface, functions, order of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method for processing wireless calls originating and terminating within a local fiber loop, comprising:

identifying a calling party as a wireless subscriber currently provided service by a local fiber optic network, wherein the local fiber optic network includes groups of base stations interconnected via multiplexers, and wherein identifying the calling party includes determining which group includes a base station by which the calling party is provided service;

identifying a called party as a subscriber currently provided service by the local fiber optic network of the calling party by determining which group includes a base station by which the called party is provided service; and connecting the calling party to the called party through a local base station within the local fiber optic network by routing the call between the multiplexers interconnecting the base stations providing service to the calling party and the called party if the calling party and called party are both subscribers currently within the local fiber loop.

2. The method of claim 1, wherein the calling party comprises a mobile cellular subscriber.

3. The method of claim 2, wherein the calling party is a fixed wireless subscriber.

4. The method of claim 3, wherein the fixed wireless subscriber communicates using a 802.11 protocol connection.

5. The method of claim 1, wherein identifying the called party further comprises:

matching subscriber identification of the called party to a database of subscribers currently registered on the local fiber network.

6. The method of claim 5, wherein the database of subscribers currently registered on the local fiber optic network is maintained on a relational database.

7. The method of claim 1, further comprising:

routing the calling party to called party connection through a base station controller outside the local fiber optic network if the called party is outside the local fiber loop.

8. The method of claim 1, further comprising:

handing off the calling party to called party connection between base transceiver stations on the local fiber loop.

9. A location base station comprising:

an interface in communication with a micro network and a macro network;

memory including a list of mobile nodes being provided wireless service by the micro network through which the location base station routes call traffic, wherein the micro network includes groups of base stations interconnected via multiplexers, and wherein the list of mobile nodes indicates for each mobile node which multiplexer connects to a base station that provides service to the mobile node; and a processor operable to update the list of mobile nodes as mobile nodes enter or leave coverage areas of the micro network, and to route call data traffic between a calling party who is a wireless subscriber currently provided service by the micro network and a called party who is also a wireless subscriber currently provided service by the micro network solely through the micro network by routing the call data traffic between the multiplexers interconnecting the base stations providing service to the calling party and the called party.

10. The location base station of claim 9, wherein the list of mobile nodes includes information regarding mobile nodes selected from the group consisting of serial numbers, mobile identification numbers, and identification numbers of the mobile nodes.

11. The location base station of claim 9, wherein the processor routes wireless channel assignment traffic for mobile nodes through the macro network.

12. The location base station of claim 9, wherein the processor accesses the list of mobile nodes being provided wireless service by the micro network within the memory to determine whether the calling party and called party are wireless subscribers currently provided service by the micro network.

13. The location base station of claim 9, wherein the processor routes call traffic between a calling party who is a wireless subscriber currently provided service by the micro network and a called party who is also a subscriber currently provided service by the macro network through the micro network and the macro network.

14. A system for connection of wireless calls provided by a local fiber optic loop originating and terminating within the local fiber optic loop, comprising:

multiplexers to provide interfaces between the local fiber optic loop and an air interface;

base stations interconnected via the multiplexers;

a wireless subscriber provided telephony service through the air interface by one of the base stations, wherein the wireless subscriber originates a call to another subscriber being provided service on the local fiber optic loop by one of the base stations; and a local base station on the local fiber optic loop, wherein the local base station identifies wireless subscriber calls originating on the local fiber optic loop that terminate to subscribers on the local fiber optic loop by identifying which base stations are providing service to the subscribers and noting which multiplexer connects to the identified base stations, and wherein the local base station provides a call connection between the wireless subscriber calls originating on the local fiber optic loop terminating to subscribers on the local fiber optic loop by routing the calls between the multiplexers interconnecting the base stations providing service to the subscribers.

15. The system of claim 14, wherein the wireless subscriber is selected from the group consisting of a mobile cellular subscriber and a fixed wireless subscriber.

16. The system of claim 14, wherein the location base station comprises a database of subscribers currently provided service on the local fiber optic loop.

17. The system of claim 16, wherein the database matches subscriber identification of the called party to subscriber identification of subscribers on the local fiber optic loop.

18. The system of claim 14, wherein the local fiber optic loop is coupled to a wide area network through the location base station.

19. The system of claim 14, wherein the local base station provides a call connection between the wireless subscriber calls originating on the local fiber optic loop terminating to subscribers outside the local fiber optic loop.

20. The system of claim 14, wherein the location base station maintains a list of wireless subscribers that are currently provided service by the local fiber optic loop.

* * * * *